May 1, 1956 A. F. G. POLCUCH 2,744,237
ELECTRICAL CONDUCTOR CONTINUITY TEST APPARATUS
Filed Jan. 14, 1952 2 Sheets-Sheet 1

INVENTOR.
ALEXANDER F. G. POLCUCH
BY
Reynolds, Beach & Christensen
ATTORNEYS

INVENTOR.
ALEXANDER F. G. POLCUCH
BY
Reynolds, Beach & Christensen
ATTORNEYS

United States Patent Office 2,744,237
Patented May 1, 1956

2,744,237

ELECTRICAL CONDUCTOR CONTINUITY TEST APPARATUS

Alexander F. G. Polcuch, Seattle, Wash., assignor to Boeing Airplane Company, Seattle, Wash., a corporation of Delaware Application January 14, 1952, Serial No. 266,399

12 Claims. (Cl. 324—51)

This invention relates to apparatus for testing the electrical continuity of conductive elements and is more specifically directed to improvements in fuse testing devices. The invention is herein illustratively described by reference to the presently preferred form thereof but it should be understood that certain variations and modifications therein may be made without departing from the underlying principles involved nor exceeding the scope of the appended claims directed thereto.

An object of the invention is a fuse tester or the like by which a reliable test may be made on a fuse or circuit limiter in situ regardless of the nature or condition of the circuit in which the fuse happens to be connected. In other words the test results are determined solely by the condition of the fuse itself and are not influenced by the number or nature of other circuit elements electrically connected to the fuse nor by existing circuit voltages or currents, or the absence thereof.

Another object of the invention is test apparatus of the type indicated which operates in such a way that its application to a fuse to be tested will not disturb the operation of any electrical circuit in which the fuse may be connected. If desired, therefore, fuses may be tested while their circuits are energized. The impedance of the test apparatus presented to the fuse terminals is so high in the range of electrical frequencies ordinarily of interest that if the fuse does happen to be open and the fuse circuit energized from its own power source, the application of the fuse tester will not create a disturbance. Should the fuse circuit be energized and the fuse being tested constitute a good fuse, it might be that varying fuse currents attending operation of the fuse circuit would trigger off the test device indication means. This would not be objectionable, however, because the resulting indication would merely show the true fact, that the fuse is conductive. Moreover, the fuse tester applies a quantum of energy to the fuse or fuse circuit so small or minute as to have negligible influence thereon.

Still another object is a test device of the nature indicated which will provide a persistent indication so that even after removal of the test device contacts from the fuse the result of the test will still show on the test indicator. This is a convenience when testing fuses in cramped quarters or under poor light conditions wherein the operator may be able to see or feel the fuse terminals to apply the test device and yet not be able conveniently to read or observe the indicator of the test device except after the test contacts have been removed from the fuse terminals.

More specific objects of the invention include the provision of a test device in handy compact, portable and completely self-contained form, one which may be held and operated easily by one hand and one which is so constituted electrically as to require a minimum of electrical energy for its operation, making it particularly suitable for portable battery operation.

With these and other objects in view as will hereinafter appear, the improved electrical conductor continuity test apparatus comprises, in brief terms, a type of arrangement wherein a varying or transient voltage is applied to the fuse terminals, giving rise to a corresponding varying magnetic field surrounding the fuse if the latter conducts current. An electromagnetic pickup positionally related to the test device contacts, and thereby to the fuse receiving test voltage from such contacts, then produces by its transformer action an electric signal which actuates indicator means in the test device.

More specifically, and in accordance with the preferred and herein illustratively described form of the fuse tester, the fuse is subjected to a momentary impulse of voltage by means preferably comprising a storage condenser charged preliminary to the test and connected to the fuse for testing its conductivity, so that if the fuse be good the resultant impulse of current flowing through it will give rise to a transient magnetic field surrounding the fuse. This magnetic field is detected by the pickup means having an induction coil whereby a trigger impulse is generated for actuating the indicator portion of the fuse tester. Preferably such indicator portion comprises a vacuum tube trigger amplifier circuit capable of being switched by the trigger impulse from an initial equilibrium condition, established preliminary to the test, to an alternate condition of equilibrium in which the amplifier circuit actuates a meter or other indicator device capable of showing the switch-over.

Thus apart from the energy required during testing operations to energize the amplifier circuit, which may be made very small because of the opportunity for using miniature vacuum tubes, the only electrical energy required for conducting fuse tests is that which is necessary to charge the storage condenser preliminary to each test, a negligible quantity. Moreover, the fuse tester can have no disturbing effect on the fuse circuit as the storage condenser discharge is relatively feeble in most instances and transpires in an extremely small fraction of a second. Moreover, when testing fuses in D.-C. circuits or even in A.-C. circuits of a frequency at which the condenser impedance may be made high, the presence of the tester contacts applied to the fuse terminals can have no noticeable effect on the fuse circuit even if the circuit be then energized, as the storage condenser is the only fuse tester circuit component connected across the contacts.

As to physical features of the improved fuse tester in its presently preferred form, a completely self-contained unitary portable structure is provided having control elements thereon all of which may be easily operated by the same hand that holds the fuse tester as it is being used. Preferably this unitary structure comprises an upper housing portion or case which contains certain electrical components of the tester and carries two pairs of test arms projecting generally parallel to each other from one end thereof, and a pistol grip handle depending from said case and being formed to house the remaining tester components. One pair of the test arms mentioned carries fuse contacts and is mounted for adjustable spacing of the contacts in order to permit testing fuses of different physical sizes and also enabling the contacts to be separated to receive and grip a fuse positively therebetween. Preferably a spring-actuated triggerlike control member operable by the index finger of the hand controls separation of the contacts. The other set of arms comprise magnetic pickup pole elements which straddle or embrace the body of a fuse when the contacts are in place. These magnetic pickup arms are disposed in a plane substantially perpendicular to the plane of the contact arms and are bridged ferromagnetically at their base to form a loop, so that magnetic flux surrounding the fuse during discharge of the condenser will pass into one such arm and out the other. A pickup coil coupled to this magnetic loop converts magnetic flux variations into the trigger impulses.

The foregoing and other features, objects and advantages of the invention including certain details of the presently preferred form of the invention will become more fully evident from the following description based upon the accompanying drawings.

Figure 2:
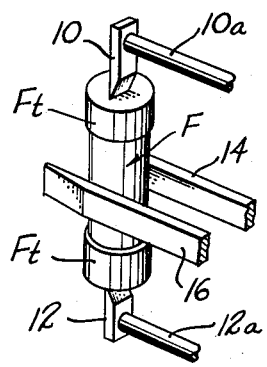
Figure 2 is a simplified perspective view illustrating a typical operative relationship of the fuse, the test contacts and arms and the magnetic pickup arms.

In Figure 2 a generally cylindrical fuse cartridge F having conductive end caps or terminals Ft is gripped between the electrical contacts 10 and 12, carried respectively by arms 10a and 12a, of the fuse tester for application of test voltage to such terminals. The fuse supporting means is not shown, but it will be understood that fuses may be tested in situ by the improved test device. The ferromagnetic arms or pole elements 14 and 16 straddle or embrace the intermediate body portion of the fuse and lie generally in a plane perpendicular to the fuse axis so as to extend generally tangentially to magnetic flux lines encircling the fuse when current flows through it between the contacts 10 and 12.

Figure 1:
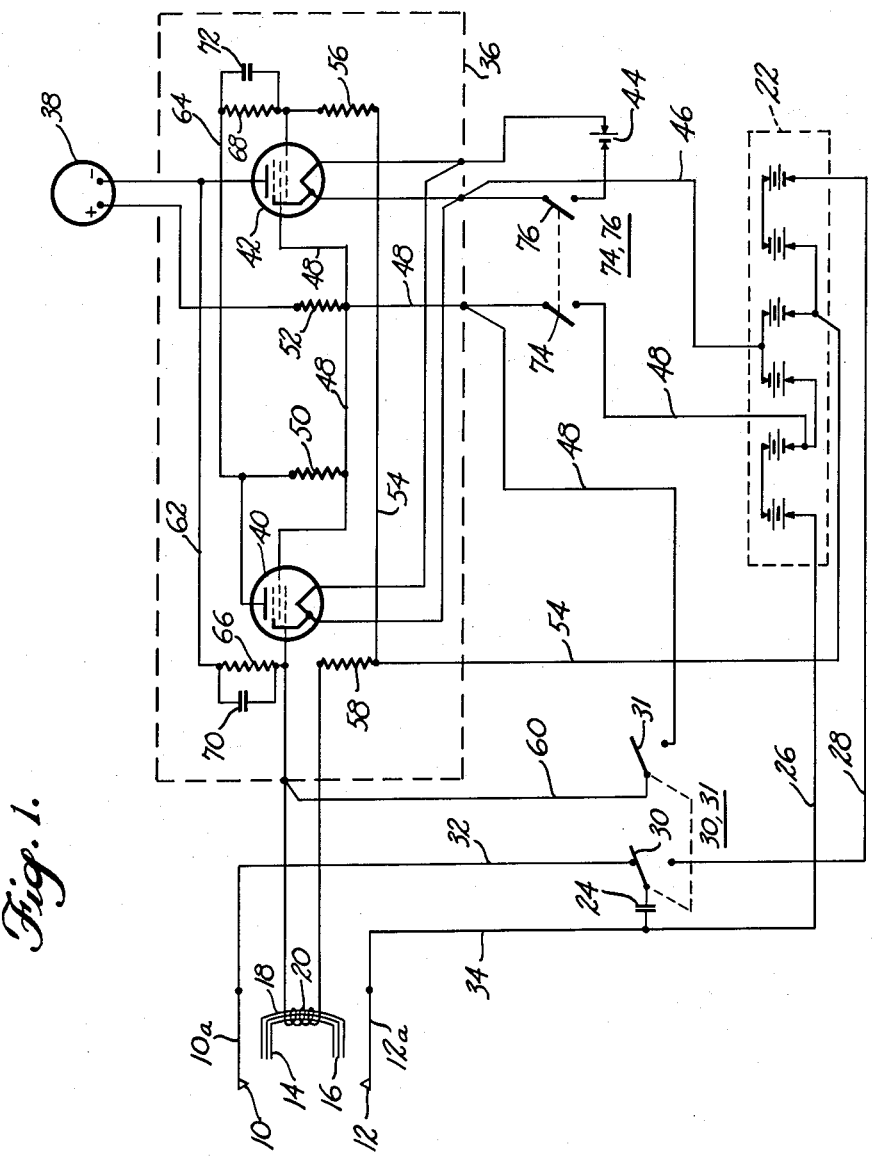
Figure 1 is a schematic diagram of the improved fuse tester in its preferred form.

In Figure 1 these elements are shown schematically. The ferromagnetic arms or pole elements 14 and 16 are bridged by a ferromagnetic member 18 constituting the core element of an induction coil 20 which, together with the elements 14, 16 and 18, comprises an electromagnetic pickup which is magnetically linked with the fuse being tested when the test contacts 10 and 12 engage the fuse terminals. The electrical power source 22 for the fuse tester comprises a series of storage cells suitably interconnected to provide the various different operating voltages required in the particular circuit. The storage condenser 24 is charged from the power source 22 through conductors 26 and 28 in the lower position of the switch arm 30 interposed in the charging circuit. When this switch arm is raised into its upper position the condenser 24 discharges through a circuit including the test contacts 10 and 12, the conductive arms 10a and 12a carrying such contacts, the electrical conductors 32 and 34 interconnecting these arms with the condenser 24, and the fuse F, if the fuse be good, and if the fuse is open or burned out, then the condenser 24 discharges through the fuse circuit itself (not shown) or by leakage current if the latter circuit also happens to be open at the time. With a good fuse the condenser discharges almost instantaneously because of the low resistance to current flow in the discharge circuit.

The sharp impulse of condenser discharge current in a good fuse sets up a magnetic field surrounding it which is equally abrupt or rapidly varying. This field quickly increases in strength to its maximum value and then quickly collapses. The portion of the total magnetic flux which passes through the ferromagnetic pickup loop and the core of pickup coil 20 thereby induces in such coil two impulses of opposite polarity, occurring in rapid succession, one being the result of magnetic flux increase and the other the result of the collapse of magnetic flux surrounding the fuse. The vacuum tube amplifier circuit 36 which together with the meter 38 comprises the indicating portion of the test device, is adapted to be triggered by one or the other of these pickup coil impulses, the particular impulse accomplishing that result being immaterial and being dependent upon the polarity of the connections of the circuit.

The particular triggered amplifier circuit 36 illustrated in Figure 1 is of the so-called "flip-flop" or "scale-of-two" type based on the Eccles-Jordan trigger circuit. Such a circuit has two equilibrium conditions and may be switched from one to the other by proper triggering. It comprises the two pentode vacuum tubes 40 and 42, the filament-cathodes of which are energized by a filament battery 44 and are connected to a reference potential point in the power source 22 by the conductor 46. Plate potential from the same source is delivered by the conductor 48 to the tubes 40 and 42 through the respective plate load resistors 50 and 52. The galvanometer 38 is connected in series with the resistor 52 and tube 42 to register plate current in that tube. The third grids of the tubes are connected to their respective cathodes, the second grids to the positive potential conductor 48, and the first grids are connected to a suitable bias potential point in the voltage source 22 by the bias conductor 54. A grid leak resistor 56 is provided for the tube 42 and a similar resistor 58 for the tube 40, the latter's first grid being connected to one side of the pick-up coil 20, which in turn is connected in series with resistor 58 to the switch arm 31 by conductor 60. Suitable cross coupling connections in the trigger circuit between the anode of each tube and the control grid of the opposing tube include the conductors 62 and 64 having in series therewith the resistors 66 and 68 and transient coupling condensers 70 and 72 by-passing such resistors, respectively.

A gang switch 74, 76, having one arm 74 to open and close the vacuum tube plate circuit and another arm 76 to open and close the filament voltage supply circuit, is normally in open position so that the amplifier circuit will cause no drain on the power source batteries. The gang switch 30, 31 is normally in its upper position shown in Figure 1, in which arm 30 connects the storage condenser 24 across the test contacts 10 and 12 and isolates the condenser from its charging circuit, while arm 31 isolates the conductor 60 from the conductor 48 at vacuum tube plate potential.

The first step in conditioning the test circuit for operation is to close the gang switch 74, 76 in order to energize the trigger amplifier 36. Sufficient time is allowed for raising the vacuum tube filaments to operating temperature.

When the contacts 10 and 12 and the magnetic poles 14 and 16 are then placed in test position relative to a fuse, as shown in Figure 2, moving the switch 30, 31 into its lower positions in Figure 1 has two effects. First of all, it applies the relatively high potential of conductor 48 to the control grid of the vacuum tube 40 and thereby triggers the circuit 36 into its initial equilibrium condition, wherein vacuum tube 40 is conductive and the opposing vacuum tube 42 is biased below cut-off, so that the galvanometer 38 registers zero current. The second effect of depressing the switch 30, 31 is to apply to the storage condenser 24 the voltage between conductors 26 and 28, thereby charging the condenser. The next step is to move the switch 30, 31, or allow it to move, into its upper position in Figure 1 (the position shown). This immediately isolates the control grid of vacuum tube 40 from the plate potential conductor 48, which in itself does not trigger the amplifier 40 into its opposite equilibrium condition, since amplifier 42 is still biased beyond cut-off. When, subsequently, the switch arms 30 and 31 reach elevated position, the former applies the voltage of condenser 24 to the test contacts 10 and 12, and, if the particular fuse being tested is a good fuse the condenser discharges immediately through the fuse. That being the case, a transient magnetic field is set up around the fuse which is detected by the pick-up coil 20.

Two voltage impulses of opposite polarity are induced in rapid sequence in the coil 20, as previously mentioned when the condenser 24 discharges through the fuse. The negative impulse from the coil 20 as it is applied to the control grid of vacuum tube 40 overcomes the positive equilibrium bias on this tube and renders the tube non-conductive, thereby triggering the vacuum tube circuit into its alternate equilibrium condition in which the roles of the two tubes are reversed. Flow of plate current in the tube 42 then causes a deflection in the galvanometer 38 and indicates the tested fuse to be good or conductive.

The positive impulse from pickup coil 20 has no effect on the vacuum tube 40, however, regardless of whether it occurs before or after the negative impulse, because if it occurs first it can merely add to the positive bias already applied to the tube 40 through the voltage-dividing combination of series resistors 58 and 66. If the positive pulse occurs second, it can still have no effect on the tube 40 because of the recovery period of the trigger circuit following triggering by the negative impulse, which period is established by the resistance and capacitance values of that circuit at a materially longer time interval than the maximum time interval between the two pulses induced in the coil 20.

Because of the nature of the trigger circuit 36 the meter 38 will continue to register the outcome of the test even after the contacts 10 and 12 are removed from the fuse, as long as the switch 74, 76 remains closed and the switch 30, 31 is not again depressed. Thus the operator may take his own time about reading the meter, which in some situations will be a definite advantage for reasons previously mentioned.

Figure 3:
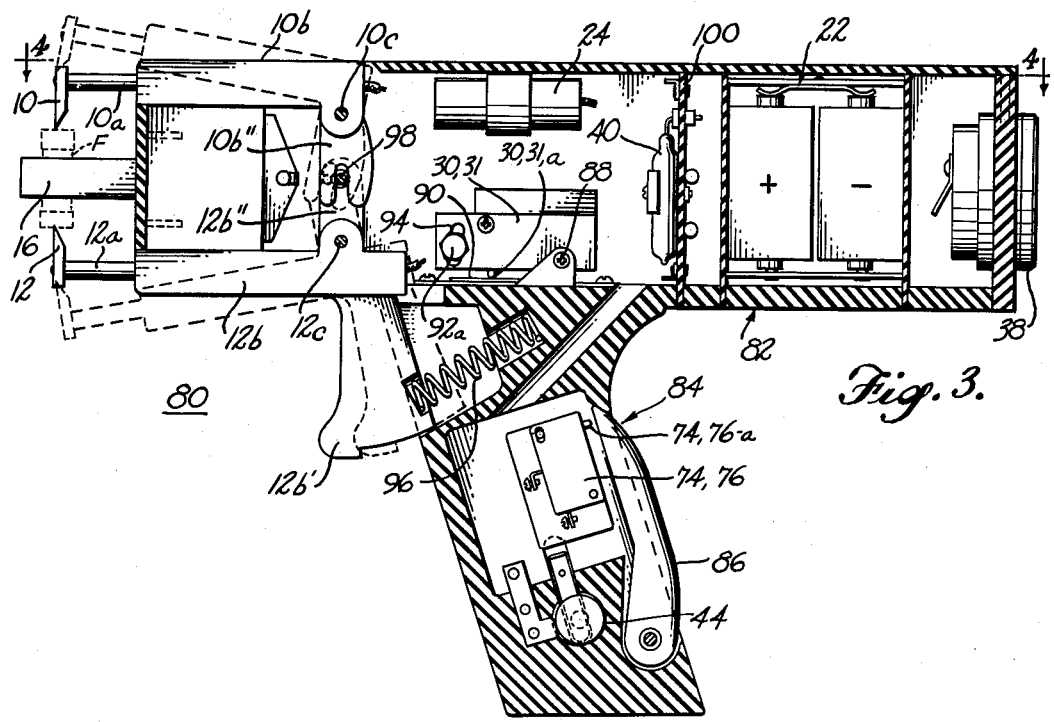
Figure 3 is a side view with parts broken away showing the actual physical form of the preferred fuse tester.
Figure 4:
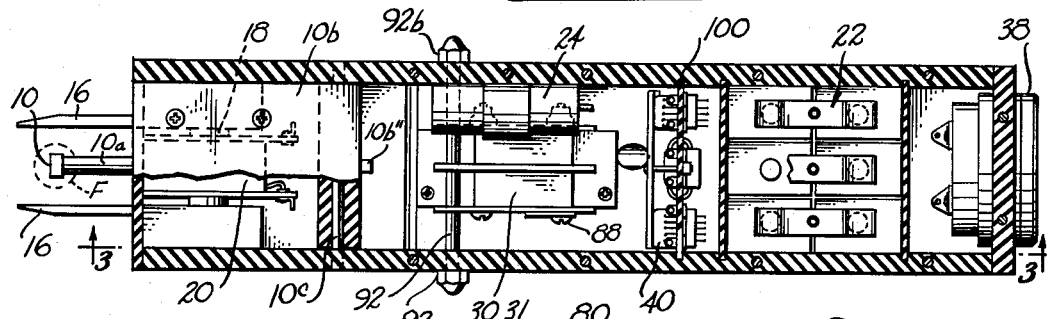
Figure 4 is a top view of the same likewise having parts removed or broken away for revealing interior details.

Figures 3 and 4 illustrate the preferred construction and packaging arrangement by which the fuse tester components are organized in a compact and easily managed unit 80. This unit comprises an elongated upper housing portion or case 82 of rectangular cross section, and a lower housing portion or hollow handle 84 in the form of a pistol grip which projects approximately at right angles from the case 82 intermediate the ends. The entire unit is of such a size and weight, is so balanced and its controls so located as to enable it to be held and operated easily by one hand of the operator.

The gang switch unit 30, 31 and the gang switch unit 74, 76 may be of any suitable type, preferably having incorporated therein return springs which urge the respective sets of switch arms into the normal positions thereof illustrated in Figure 1. The switch unit 74, 76 mounted in the handle 84 with its actuating plunger, 74, 76–a projecting toward the rear of the handle, is actuated by the heel of the operator's hand which presses the pivoted striker bar 74 at the rear edge of the handle into a handle slot and against the switch plunger when such handle is grasped and squeezed in the operator's hand. The body of switch unit 30, 31 is pivotally supported above the handle in the case 82 by a transverse pivot pin 88 and is oriented with its normally extended actuating plunger 30, 31–a projecting downwardly to rest on the striker plate 90. This switch unit is actuated by a transverse control rod 92 secured to the switch case and having end knobs 92a and 92b located on opposite outer sides of the housing 82 by which to swing the switch bodily downward about its pivot pin 88 until the actuating plunger 30, 31–a engages and is pressed inward by the striker plate 90 to actuate the switch contact arms. One or the other of the knobs 92a and 92b may be pressed downward momentarily by the thumb, depending upon which hand holds the unit, while the switch 74, 76 is held in actuated position continuously by squeezing the handle and the striker bar 86 together. The control rod 92 moves along arcuate slots 94 in the housing sides when the knobs are depressed and released.

The forward or operating end of the case 82 carries the two ferromagnetic arms or pole elements 14 and 16 and the test contact arms 10a and 12a. Because it is the general practice to mount most fuses vertically in fuse terminal boards, the magnetic pickup arms 16 are spaced apart transversely of the unit in a horizontal plane so as to straddle the fuse when the tester is held in the most comfortable position, namely in a generally vertical plane, as a pistol firearm is held for horizontal firing. The contact arms 10a and 12a are then necessarily spaced apart in a vertical plane equal distances above and below the pickup elements, respectively. Suitably insulated from each other and from other parts of the unit, these contact arms are carried by, or comprise forward extension arms of bell cranks 10b and 12b, respectively, mounted to be swung about vertically spaced horizontal pivots 10c and 12c, in order to vary the spacing between test contacts 10 and 12. The lower bell crank 12b has a depending lever arm 12b' positioned somewhat forwardly of the upper front portion of the handle 84 to physically resemble the trigger of a pistol firearm. An internal spring 96 socketed in the handle urges this trigger-lever forwardly and normally holds the contact arm 12a in its upper limit position extending generally parallel to the magnetic pickup arms 14 and 16. The contact arm 12a is swung downward by pressing the trigger lever 12b' toward the handle 84 by the forefinger of the operator's hand. A slot-and-pin coupling 98 interconnecting the respective bell crank arms 10b'' and 12b'' coordinate swinging of the contact arms, so that any movement of the trigger 12b' produces an equal and opposite movement of the test contacts 10 and 12.

The ferromagnetic pickup elements or arms 14 and 16 project from the forward end of the housing 82 to locations somewhat beyond the contacts 10 and 12 and thereby are disposed favorably to the reception of a substantial portion of the total magnetic flux which surrounds a good fuse when the fuse is subjected to voltage from the test contacts. This magnetic flux flows into one of the elements 14 or 16 and out the other, passing through the intermediate ferromagnetic core piece 18 within pickup coil 20, which core piece bridges between the inner ends of the magnetic pickup arms 14 and 16.

The meter 38 is conveniently mounted at the rear end of the case 82 normally facing the operator, a position wherein the indication may be readily observed while the unit is in operative position. Storage condenser 24 is mounted in the upper housing 82 above switch 30, 31. The batteries of power source 22 are mounted behind the meter, while major trigger circuit components, including miniature vacuum tubes 40 and 42, are mounted on the transverse terminal strip 100 behind the power pack 22 as shown. The filament supply battery 44 is mounted in the handle 84 below the switch 74, 76. These and other incidental or secondary details are included merely for purposes of illustrating a preferred form of the device, but are, of course, not essential to carrying out the broad principles of the fuse-testing apparatus.

In order to operate the test apparatus for testing a fuse, for example, the operator first grasps the handle 84 as he would that of a pistol firearm and squeezes it to depress the striker bar 86 and actuate the switch 74, 76. This applies plate voltage to the amplifiers 40 and 42 and applies filament or heater voltage to these tubes. After sufficient time has been allowed for the tubes to warm up to operating condition, the operator next squeezes the trigger 12b' to separate the test contacts 10 and 12 from each other, and advances the unit until the pointed inner ends of these contacts are opposite the end faces of the fuse. The operator then releases the trigger 12b' and allows the spring 96 to press the contacts against opposite ends of the fuse to establish a firm electrical contact therewith. The next step is to momentarily actuate the switch unit 30, 31 by causing momentary downward deflection of either of the control knobs 92a or 92b, and thereby charge the storage condenser 24 and simultaneously switch the trigger circuit 36 to its initial equilibrium condition by application of a positive voltage to the grid of tube 40. As the operator releases the control knob 92a or 92b, the switch 30, 31 returns to its initial position by the force of its internal spring, and as it begins this return movement the contact of arm 31 is first interrupted to isolate tube 40 from conductor 60. Upon completion of such return movement the switch arm 30 forms a circuit permitting condenser 24 to discharge through a good fuse between the contacts 10 and 12. This sets up a magnetic flux surrounding the fuse which is picked up by the coil 20 and results in a trigger impulse being applied to the control grid of tube 40 effecting reversal of the conductive state of the trigger circuit 36 and causing the meter 38 to provide a sustained reading. As long as the operator continues to hold the striker bar 86 against the handle 84 the circuit 36 will remain energized and the meter 38 will hold its reading so that it may be observed at any convenient time even after the contacts 10 and 12 are removed from the fuse.

I claim as my invention:

1. A device for testing the continuity of fuses in situ comprising a portable support, a pair of electric contacts carried in spaced-apart relationship by said support for engaging the fuse terminals, magnetic induction pick-up means carried by said support generally intermediate said contacts and offset therefrom laterally for responding selectively to a change of magnetic flux encircling a fuse engaged by such contacts, impulse generating circuit means connected to said contacts and operable for applying a test voltage impulse to a fuse engaged by said contacts, and indicator means connected to said pick-up means for actuation by the response of said pick-up means.

2. The test device defined in claim 1, wherein the portable support includes a pair of elements carrying the respective contacts, one such support being movable toward and from the other.

3. The test device defined in claim 2, and means resiliently urging the contact-carrying elements toward one another, and manually operated means for urging such elements apart to accommodate a fuse between the contacts.

4. Test apparatus defined in claim 3, wherein the contact-carrying elements comprise corresponding arms of a pair of substantially coplanar bell cranks mounted on pivots spaced apart in a line substantially perpendicular to said arms, said bell cranks further having coordinating arms projecting generally toward each other, and means pivotally and slidably interconnecting such coordinating arms producing conjoint swinging of said bell cranks.

5. The test device defined in claim 4, wherein the magnetic pick-up means comprises a pair of ferromagnetic pole elements projecting from the support in spaced-apart relationship to receive a fuse therebetween.

6. The test device defined in claim 1, wherein the impulse generating circuit means comprises a storage condenser, a voltage source, switch means actuatable for charging said condenser from said source, and switch means actuatable for applying the charge of said condenser to the contacts, said two switch means being mechanically coordinated to require alternate actuation thereof manually.

7. The test device defined in claim 6, wherein the indicator means comprises circuit means having two steady state operating conditions, means operable preliminary to a test for establishing one of said circuit conditions, means controlled by the magnetic pick-up means for establishing the alternate circuit condition in response to an impulse from said pick-up means, and means operated by said circuit means for indicating the prevailing circuit condition.

8. The test device defined in claim 6, wherein the indicator means comprises circuit means having two steady state operating conditions, means operable in response to actuation of the first-mentioned switch means for establishing one of said circuit conditions, means controlled by the magnetic pick-up means for establishing the alternate circuit condition in response to an impulse from said pick-up means, and means operated by said circuit means for indicating the prevailing circuit condition.

9. The test device defined in claim 1, wherein the indicator means comprises circuit means having two steady state operating conditions, means operable preliminary to a test for establishing one of said circuit conditions, means controlled by the magnetic pick-up means for establishing the alternate circuit condition in response to an impulse from said pick-up means, and means operated by said circuit means for indicating the prevailing circuit condition.

10. The test device defined in claim 9, wherein the circuit means comprises a scale-of-two trigger circuit including interconnected amplifiers each having a control element, the control element of one such amplifier being connected to the pick-up means.

11. A portable device for testing the continuity of fuses in situ comprising a portable support, a pair of arms pivoted on said support and projecting from one end thereof in generally parallel relationship for swinging toward and from each other, a pair of electric contacts carried by the respective arms for engaging the terminals of a fuse, a manually operated member on said support connected to said arms for separating the same by actuation of said member, a spring urging said arms toward each other, magnetic induction pick-up means including a pair of ferromagnetic pole pieces projecting from said end of the support generally parallel to said arms from locations on opposite sides of the space between said arms and contacts so as to straddle a fuse engaged by said contacts, means for applying a voltage impulse to a fuse engaged by said contacts, and indicator means responsive to the voltage impulse induced in said pick-up means by the magnetic flux transient from the resulting impulse of current in a good fuse.

12. The test device defined in claim 11, wherein the portable support comprises an elongated casing member having a laterally extending pistol-grip handle thereon, the arms and pole pieces being mounted on the casing member to project from one end thereof.

References Cited in the file of this patent

UNITED STATES PATENTS

| | | |
|---|---|---|
| 659,357 | Athearn | Oct. 9, 1900 |
| 1,893,074 | Drake | Jan. 3, 1933 |
| 2,404,047 | Flory | July 16, 1946 |
| 2,466,079 | Brunt | Apr. 5, 1949 |
| 2,580,192 | Potter | Dec. 25, 1951 |
| 2,586,125 | Van Blarcom | Feb. 19, 1952 |
| 2,589,465 | Weiner | Mar. 18, 1952 |